United States Patent [19]
Schechter

[11] Patent Number: 5,255,637
[45] Date of Patent: Oct. 26, 1993

[54] INTERNAL COMBUSTION ENGINE WITH ADAPTIVE CONTROL OF COMPRESSION RATIO

[75] Inventor: Michael M. Schechter, Farmington Hills, Mich.

[73] Assignee: Ford Motor Company, Dearborn, Mich.

[21] Appl. No.: 876,154

[22] Filed: Apr. 30, 1992

[51] Int. Cl.$^5$ .................. F02D 13/02; F02D 15/00
[52] U.S. Cl. ........................ 123/48 R; 123/78 R; 123/90.15
[58] Field of Search .......... 123/48 R, 48 B, 48 D, 123/78 R, 90.11, 90.15, 90.16, 403

[56] References Cited

U.S. PATENT DOCUMENTS

| | | | |
|---|---|---|---|
| 2,670,595 | 3/1954 | Miller | 123/90.16 X |
| 2,773,490 | 12/1956 | Miller | 123/90.16 X |
| 2,780,912 | 2/1957 | Miller | 123/90.16 X |
| 2,785,667 | 3/1957 | Miller | 123/90.16 |
| 2,910,826 | 11/1959 | Mansfield | 123/48 B X |
| 2,936,575 | 5/1960 | Lieberherr | 123/90.16 X |
| 3,270,730 | 9/1966 | Timoney | 123/48 R X |
| 3,986,351 | 10/1976 | Woods et al. | 60/274 |
| 4,075,990 | 2/1978 | Ribeton | 123/559.1 |
| 4,174,683 | 11/1979 | Vivian | 123/90.15 X |
| 4,426,985 | 1/1984 | Kanesaka | 123/403 X |
| 4,539,946 | 9/1985 | Hedelin | 123/48 A |
| 4,753,198 | 6/1988 | Heath | 123/51 AA |
| 4,834,031 | 5/1989 | Katoh et al. | 123/48 R |
| 4,852,353 | 8/1989 | Holmer | 60/605.1 |
| 4,860,711 | 8/1989 | Morikawa | 123/48 D |
| 4,916,903 | 4/1990 | Holmer | 60/605.1 |
| 4,945,870 | 8/1990 | Richeson | 123/90.11 |
| 4,958,606 | 9/1990 | Hitomi et al. | 123/316 |
| 5,115,782 | 5/1992 | Klinke et al. | 123/90.11 |
| 5,140,955 | 8/1992 | Sono et al. | 123/90.11 X |

Primary Examiner—Tony M. Argenbright
Attorney, Agent, or Firm—Jerome R. Drouillard; Roger L. May

[57] ABSTRACT

An internal combustion engine having variable intake valve timing to control the compression work performed by the piston, so as to avoid knocking operation while allowing maximum use of exhaust energy in the event that the engine is equipped with a turbocharger.

1 Claim, 2 Drawing Sheets

INTERNAL COMBUSTION ENGINE WITH ADAPTIVE CONTROL OF COMPRESSION RATIO

BACKGROUND OF THE INVENTION

The present invention relates to a system and method for controlling the charging of an internal combustion engine's cylinders so as to improve fuel efficiency and to increase peak power while preventing engine knock.

Disclosure Information

With the advent of electronic engine controls, it has been common to control knocking in spark-ignited internal combustion engines by adjusting the spark advance in response to sensed engine knocking. In turbocharged engines, however, adjustment of spark timing is frequently not sufficient to prevent knock. Accordingly, wastegating is used with conventional turbocharged engines to prevent excessive intake air charging pressure at higher engine speeds. During wastegating, some of the exhaust gas bypasses the turbocharger and the residual energy of the bypassed fraction, which could otherwise be used to drive the gas turbine, is lost. The present invention proposes to control engine knocking by adjusting the compression ratio of the engine in response to either sensed knocking or in response to other engine operating parameters indicating that the engine is operating in a regime in which knock may occur. This is especially useful with turbocharged engines. With a turbocharged engine, the present invention improves engine fuel efficiency and power output by allowing the fraction of total compression work performed by the piston to be reduced, while the fraction of total compression work performed by the turbocharger is increased.

U.S. Pat. No. 4,958,606 discloses an engine having a conventionally wastegated turbocharger control system to control turbo boost and which measures engine load and adjusts an intake manifold restrictor element in response to such load. It is an object of the present invention to obviate the need for wastegating in turbocharged or supercharged engines operated with variable valve timing.

It is an advantage of the present invention that costly, troublesome wastegating may be avoided with both turbocharged and supercharged engines; this will yield improved fuel efficiency and increased peak power.

SUMMARY OF THE INVENTION

A reciprocating engine, including at least one piston slidably housed within a cylinder, has a knock sensor for identifying knocking in the engine and for generating a knock signal in response to the sensed knocking, and a control unit for receiving a knock signal and for operating a variable valve timing mechanism in response thereto. The variable valve timing mechanism actuates one or more intake valves associated with the cylinder, with the valves being operated so that the timing of the intake valve closing is altered when knocking is sensed. Alternatively, the control unit may operate a variable compression ratio mechanism so that the engine's compression ratio is decreased when knocking is sensed. If a turbocharger is used, it may be employed according to the present invention without a wastegate so that the turbine expander portion of the turbocharger receives all the exhaust flowing from the engine under all operating conditions. The control unit may utilize signals relating to speed, load, knocking, or other engine operating parameters, so as to adjust the variable valve timing mechanism such that the overall compression work performed on the air charge by both the turbocharger and the engine's pistons is limited to an amount at which the engine will not knock.

DETAILED DESCRIPTION OF PREFERRED EMBODIMENTS

Figure 1:
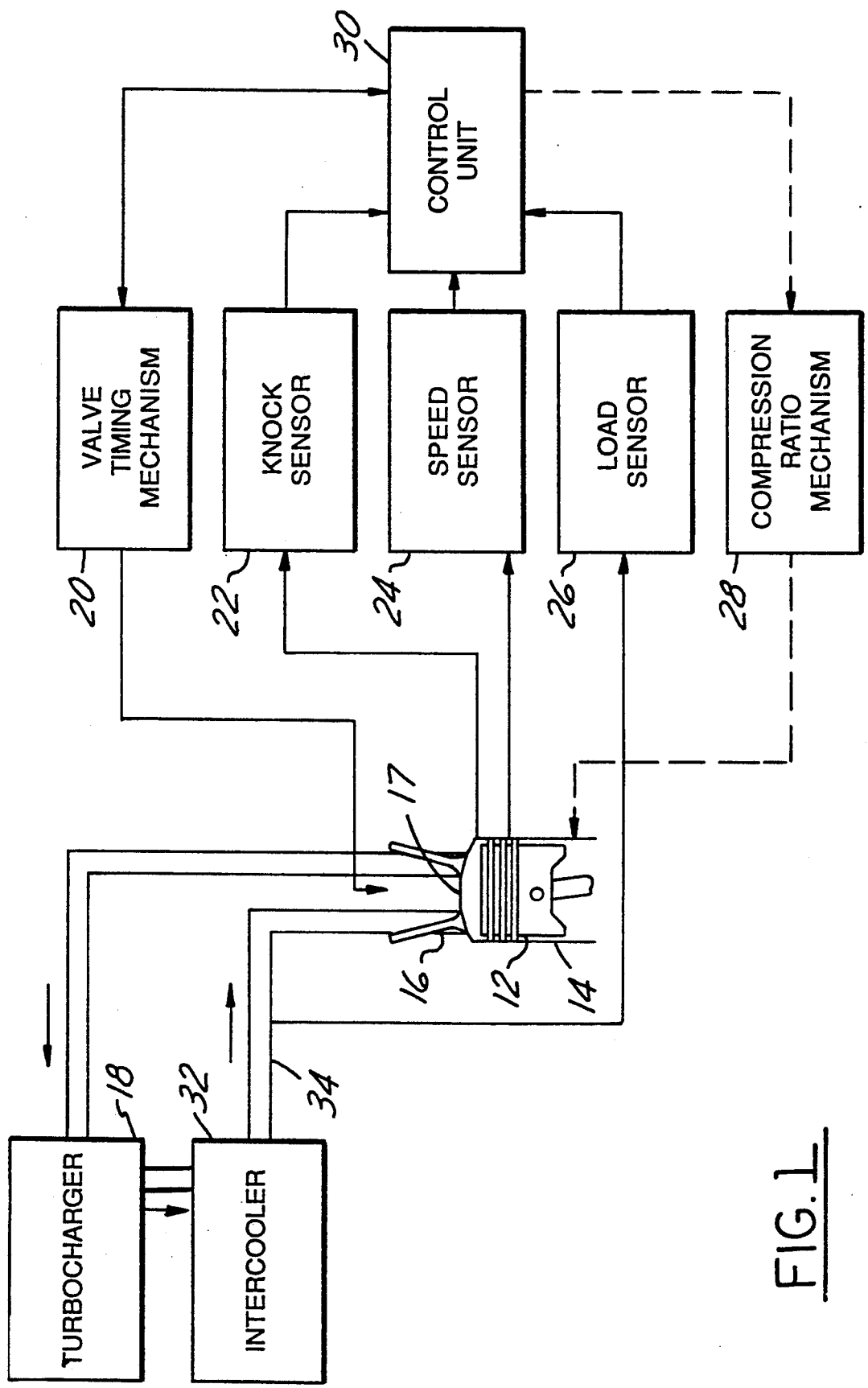
FIG. 1 is a schematic representation of an engine equipped according to the present invention.

FIG. 1 illustrates an engine system according to the present invention in which a piston, 12, is slidably housed within a cylinder, 14, which is provided with air/fuel mixture via an intake valve, 16, which is located in cylinder head 17. Intake valve 16 controls the flow of intake charge via an intake manifold, 34, from a turbocharger, 18, and an optional intercooler, 32. Turbocharger 18 is run without a wastegate; its effective boost is limited either by an adjustable valve timing mechanism, 20, or alternatively, by a compression ratio adjustment mechanism, 28. Those skilled in the art will appreciate in view of this disclosure that a system according to the present invention could be used with a wastegate having a limited range of authority, as compared with conventional wastegating systems. It will be further appreciated that a system according to the present invention could be used with engines having multiple turbochargers.

Valve timing mechanism 20 and compression ratio mechanism 28, which may comprise any of the several known arrangements for accomplishing such functions, are operated by control unit 30, which receives inputs from knock sensor 22, or from engine speed sensor 24, or load sensor 26. These sensors are all engine operating parameter sensors which generate output signals having values which correspond to the value of the sensed parameter. Control unit 30, using a lookup table system or other operating strategy known to those skilled in the art and suggested by this disclosure, will read the sensed engine operating parameters, as indicated by the output signals and adjust the engine's valve timing or compression ratio accordingly, by issuing a valve timing change signal or compression ratio change signal. For example, if the speed and load inputs exceed predetermined values, the control unit may direct valve timing mechanism 20 to close the intake valve early. An example of a valve timing mechanism suitable for use in a system according to the present invention is described in U.S. patent application No. 5,127,375, issued Jul. 7, 1992, which is assigned to the assignee of the present invention and which is hereby incorporated by reference herein.

Figure 2:
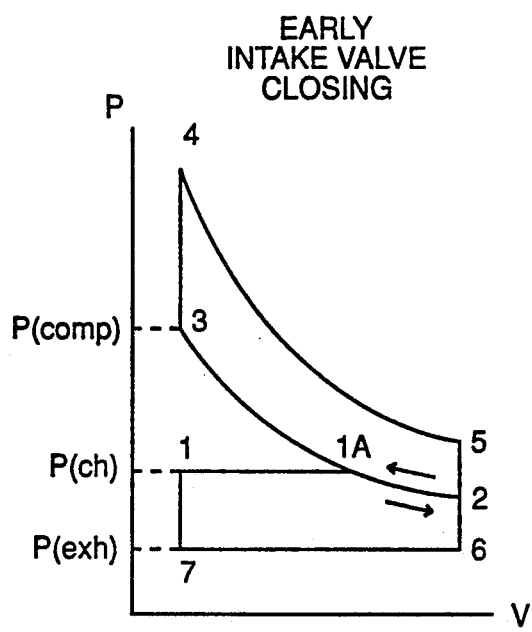
FIG. 2 is a pressure-volume ("P-V") diagram for a non-wastegated turbocharged engine according to the present invention and having variable early intake valve closing.
Figure 3:
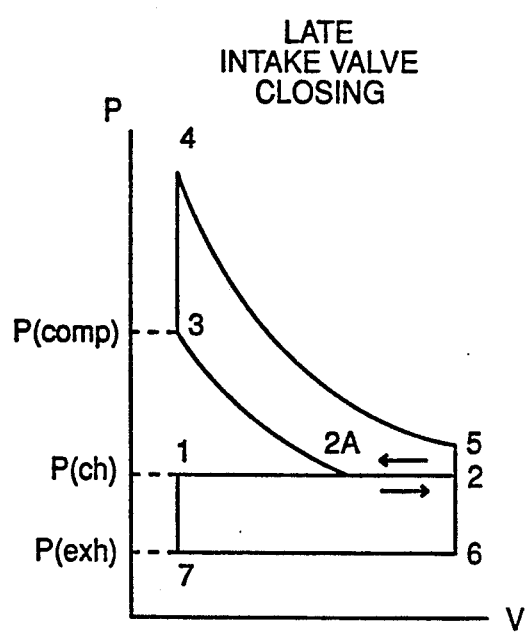
FIG. 3 is a P-V diagram for a non-wastegated turbocharged engine according to the present invention, operated with variable late intake valve closing.
Figure 4:
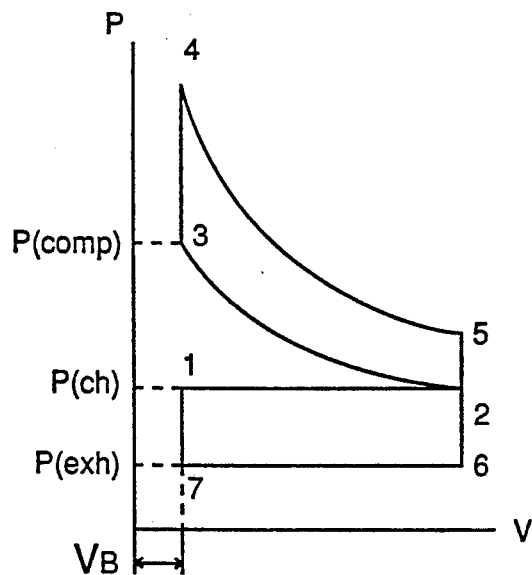
FIG. 4 is a P-V diagram according to another aspect of the present invention in which clearance volume of a non-wastegated turbocharged engine is adjusted to achieve knock-free operation.

Knock sensor 22 will sense knock in engine 10 and generate a knock signal in response to the sensed knocking. Upon receipt of a knock signal, control unit 30 operates variable valve timing mechanism 20 to either close intake valve 16 early as shown in FIG. 2 or late as shown in FIG. 3. Alternatively, control unit 30 may be used to alter the compression ratio by operating compression ratio mechanism 28 as shown in FIG. 4. As noted previously, those skilled in the art will appreciate in view of this disclosure that any of the known valve timing mechanisms or compression ratio altering mechanisms may be used to control compression pressure in an engine according to the present invention.

Figure 5:
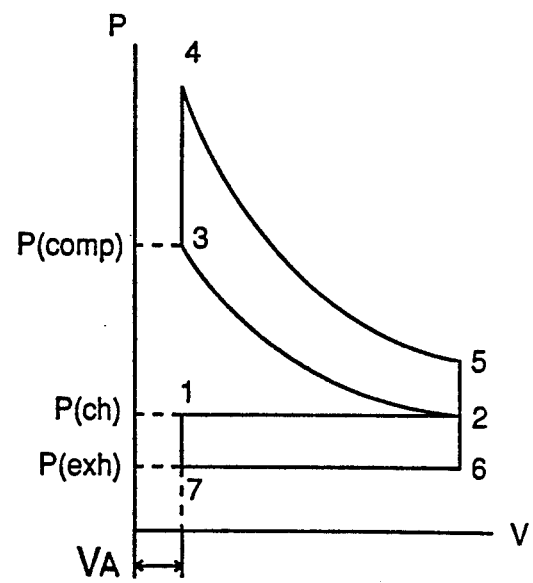
FIG. 5 is P-V diagram for a conventional prior art engine having a wastegated turbocharger.

Turning now to the P-V diagram for a conventional turbocharged engine shown in FIG. 5, the intake stroke occurs at a pressure $P_{(ch)}$. During the intake stroke from points 1 to 2, the engine cylinder is filled with air at pressure $P_{(ch)}$, which is controlled by wastegating. During the compression stroke between points 2 and 3, intake charge is compressed to the compression pressure $P_{(comp)}$, which is assumed to be the highest permissible compression pressure.

FIG. 2 illustrates an engine according to the present invention, having a turbocharger which is not wastegated. As a result, the charging pressure $P_{(ch)}$ of FIG. 2 is considerably greater than that of FIG. 5. However, intake valve 16 is closed early and the cylinder filling process is interrupted at point 1A. This traps a smaller volume of air in engine cylinder 14. Timing of the intake valve closing may be selected so that the mass of the trapped intake charge is the same as the case illustrated in FIG. 5.

From point 1A to point 2 of FIG. 2, the intake charge expands. During the compression stroke extending between points 2 and 3, charge is compressed to pressure $P_{(comp)}$. Because the mass of intake charge and the compression ratio in the case illustrated in FIG. 2 are equal to values of these parameters in the case illustrated in FIG. 5, the compression pressures $P_{(comp)}$ in both cases are equal too. As the pressure $P_{(ch)}$ in FIG. 2 varies with engine speed, the timing of point 1A is varied so as to maintain the same pressure $P_{(comp)}$.

FIG. 3 illustrates operation of an engine according to another aspect of the present invention with late intake valve closing. From point 1 to point 2, cylinder 14 is filled with intake charge. From point 2 to point 2A, the charge is pushed back into intake manifold 34 past open intake valve 16. It is thus seen that intake valve 16 remains open during a substantial portion of the compression stroke. As with FIG. 2, the mass of the trapped intake charge is the same as in FIG. 5. From point 2A to point 3 of FIG. 3, the intake charge is compressed to compression pressure $P_{(comp)}$ which, again, is equal to the maximum compression pressure $P_{(comp)}$ of FIG. 5. Note that the exhaust pressure, $P_{(exh)}$ is the same in all cases.

Operation of a turbocharged engine without wastegating according to the cycles shown in FIGS. 2 and 3 offers the advantage of improved fuel efficiency and, in some cases, higher power density. The intake air supplied to the engine cylinders in the cases illustrated in FIGS. 2 and 3 is at a higher internal energy level than in the case illustrated in FIG. 5. Accordingly, the net energy transferred from the piston to the gas during the intake and compression strokes is less with the engines illustrated in FIGS. 2 and 3 than that of FIG. 5. Because the net energy transfer from the gas to the piston during the expansion and exhaust strokes is the same in all three cases, the net indicated work performed on the piston during the entire cycle, and therefore, the gross indicated mean effective pressure (IMEP) is larger in cases illustrated in FIGS. 2 and 3 than in FIG. 5, all taken at equal fuel consumption. This means that at equal IMEP, fuel consumption in the cases illustrated in FIGS. 2 and 3 will be lower than that in FIG. 5.

If turbocharging with intercooling is used with the engines shown in FIGS. 2 and 3, the charge air temperature at point 3 can be lower than shown in FIG. 5 because the air coming out of the compressor section of the turbocharger can be cooled to approximately the same intake temperature in all three cases. Accordingly, higher compression pressure P(comp) can be allowed in the cases illustrated in FIGS. 2 and 3 without causing engine knock. Lower air temperature and higher pressure at the end of compression at point 3 translate to larger mass intake charge and, therefore, higher engine power density.

Another method for eliminating wastegating is to equip the engine with a variable compression ratio mechanism. FIG. 4 illustrates the pressure volume diagram for a turbocharged cycle in which conventional wastegating is replaced by a variable compression ratio. Base clearance volume or a combustion chamber volume is shown in FIG. 5 as $V_A$. In FIG. 4, the volume is increased to $V_B$. Accordingly, the compression ratio is smaller in the system of FIG. 4, as compared with FIG. 5. As the charging pressure $P_{(ch)}$ in FIG. 4 varies with engine speed, the compression ratio is varied so as to maintain the same pressure $P_{(comp)}$ as in FIG. 5. Because the mass intake charge is larger in FIG. 4 than in FIG. 5, while the displacements are equal, FIG. 4 represents an engine with higher power density. This density is achieved at the expense of lower indicated efficiency due to reduced compression ratio.

I claim:

1. A reciprocating internal combustion engine comprising:
   at least one piston slidably housed within a cylinder, with said piston and cylinder defining a clearance volume when said piston is at top dead center;
   an intake valve and intake manifold for admitting air/fuel charge into said cylinder;
   at least one turbocharger for increasing the amount of air/fuel mixture passing into said cylinder, with said turbocharger comprising a compressor driven by a turbine expander which receives all of the exhaust flowing from said engine under all operating conditions;
   sensor means for sensing at least one operating parameter of the engine and for generating an output signal corresponding to the value of the sensed operating parameter;
   a control unit for receiving said output signal and for operating a variable valve timing mechanism in response thereto; and
   a variable compression ratio mechanism for adjusting the magnitude of said clearance volume, with said compression ratio mechanism being operated by said control unit so that as the pressure output of the turbocharger increases, the fraction of total compression work performed by the piston is decreased while the fraction of total compression work performed by the turbocharger is increased, such that the power output and fuel efficiency of the engine are increased.

* * * * *